(12) United States Patent
Mishra et al.

(10) Patent No.: US 12,096,248 B2
(45) Date of Patent: Sep. 17, 2024

(54) METHOD AND SYSTEM FOR IMPROVING WI-FI PERFORMANCE IN CO-EXISTING COMMUNICATION NETWORKS

(71) Applicant: Tata Consultancy Services Limited, Mumbai (IN)

(72) Inventors: Garima Mishra, Bangalore (IN); Nikita Trivedi, Bangalore (IN); Hemant Kumar Rath, Bhubaneswar (IN); Bighnaraj Panigrahi, Bangalore (IN); Shameemraj Nadaf, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 342 days.

(21) Appl. No.: 17/662,053

(22) Filed: May 4, 2022

(65) Prior Publication Data

US 2023/0061247 A1 Mar. 2, 2023

(30) Foreign Application Priority Data

Jul. 23, 2021 (IN) .............................. 202121033277

(51) Int. Cl.
*H04W 24/02* (2009.01)
*H04B 1/715* (2011.01)
(Continued)

(52) U.S. Cl.
CPC ............ *H04W 24/02* (2013.01); *H04B 1/715* (2013.01); *H04W 16/14* (2013.01); *H04W 72/541* (2023.01); *H04W 84/12* (2013.01)

(58) Field of Classification Search
None
See application file for complete search history.

(56) References Cited

U.S. PATENT DOCUMENTS

| 8,737,924 B2 * | 5/2014 | Fu ........................ H04B 1/1027 455/296 |
| 9,743,418 B1 * | 8/2017 | Jupudi .................. H04W 24/02 |

(Continued)

OTHER PUBLICATIONS

Sheshadri, Ramanujan K et al., "ELI: Empowering LTE with Interference Awareness in Unlicensed Spectrum", International Conference on Network Protocols (ICNP), Date: Sep. 2018, Publisher: IEEE, https://cse.buffalo.edu/faculty/dimitrio/publications/icnp18.pdf.

(Continued)

*Primary Examiner* — Kenneth B Wells
(74) *Attorney, Agent, or Firm* — Finnegan, Henderson, Farabow, Garrett & Dunner, LLP

(57) ABSTRACT

This disclosure relates to method and system for improving Wi-Fi performance in co-existing communication networks using learning methodologies. In recent times, most of telecom operators have expressed interest in deploying LTE (Long-Term Evolution) over the unlicensed spectrum. However, simultaneous use of unlicensed band (by operators using LTE and other Wi-Fi) presents coexistence challenges in terms of network performance especially for the Wi-Fi. The disclosed techniques enable improving the Wi-Fi performance in the co-existing communication networks based on learning methodologies. The disclosed techniques improve Wi-Fi performance based on several steps that includes detecting an interfering channel, and further identifying an optimal channel to mitigate the interference caused by the detected interfering channel. The optimal channel is identified based on an optimization technique, wherein the optimization technique is a reinforcement learning technique based on a Q-learning.

11 Claims, 10 Drawing Sheets

(51) Int. Cl.
*H04W 16/14* (2009.01)
*H04W 72/541* (2023.01)
*H04W 84/12* (2009.01)

(56) References Cited

U.S. PATENT DOCUMENTS

| | | | |
|---|---|---|---|
| 10,362,489 B1 * | 7/2019 | Desai | H04W 16/14 |
| 10,405,191 B2 | 9/2019 | Mushunuri et al. | |
| 10,542,460 B2 * | 1/2020 | Bhorkar | H04W 74/0808 |
| 10,595,276 B1 * | 3/2020 | Vargantwar | H04W 74/0816 |
| 10,880,899 B2 * | 12/2020 | Kim | H04B 7/18506 |
| 11,178,575 B2 * | 11/2021 | Bhorkar | H04W 28/18 |
| 11,388,645 B2 * | 7/2022 | Larsson | H04W 24/10 |

OTHER PUBLICATIONS

Ramachandran, Krishna N. et al., "Interference-Aware Channel Assignment in Multi-Radio Wireless Mesh Networks", I Proceedings IEEE INFOCOM 2006. 25TH IEEE International Conference on Computer Communications, Date: Apr. 2006, vol. 122, pp. 62-73, Publisher: IEEE, https://www.researchgate.net/publication/221244973_Interference-Aware_Channel_Assignment_in_Multi-Radio_Wireless_Mesh_Networks/link/02bfe50d2058864249000000/download.

Wang, Xuyu et al., "A survey of LTE Wi-Fi coexistence in unlicensed bands", GetMobile: Mobile Computing and Communications, Date: Jul. 2016, vol. 20, Issue: 3, Publisher: ACM, http://www.eng.auburn.edu/~szm0001/papers/LTE-U_survey_XuyuWang.pdf.

* cited by examiner

METHOD AND SYSTEM FOR IMPROVING WI-FI PERFORMANCE IN CO-EXISTING COMMUNICATION NETWORKS

PRIORITY CLAIM

This U.S. patent application claims priority under 35 U.S.C. § 119 to: India Application No. 202121033277, filed on 23 Jul. 2021. The entire contents of the aforementioned application are incorporated herein by reference.

TECHNICAL FIELD

The disclosure herein generally relates to the field of co-existing communication networks, and, more particularly, to a method and a system for improving Wi-Fi performance in co-existing communication networks based on learning methods.

BACKGROUND

Spectrum is one of the powerful resources that is shaping the communication industry, wherein spectrum is a range of radio waves used for communication purposes. Spectrum is a finite resource; hence to facilitate efficient usage of spectrum, the spectrum is divided into two categories: licensed spectrum and unlicensed spectrum. Under licensed spectrum—special licenses are taken by operators to operate with dedicated parts of the radio spectrum bands, wherein except the license holder no other operator is allowed to use that part of the spectrum band for any purpose. On the other side, the unlicensed spectrum is not owned by any specific organization or person or operator and therefore there are no rules associated with spectrum access.

In recent times, most of telecom operators have expressed interest in deploying LTE (Long-Term Evolution) networks over the unlicensed spectrum. However, all the prominent variations of LTE over unlicensed (LTE-Unlicensed (LTE-U)/Licensed-Assisted Access (LAA), etc.) spectrum rely on access to both licensed and unlicensed spectrum. As per the 3GPP standard, the LTE control channels operate in a licensed spectrum, and a mobile operator has the flexibility to send data to devices over licensed and/or unlicensed spectrum. While the licensed spectrum is specific to the license agreement between the operator and regulator, the unlicensed spectrum is confined to many license free bands, out of which 2.4 GHz band (between 2400 MHz to 2500 MHz) and 5 GHz band (5725 MHz to 5875 MHz) are popularly used by Wi-Fi technology. The bands are subdivided into multiple channels, wherein channels can be shared between networks but only one transmitter can locally transmit on a channel at any point of time. Since these bands are license free bands, other than the unlicensed users like Wi-Fi, licensed users like LTE users also attempt to use today. This simultaneous use of unlicensed spectrum (by operators using LTE and other Wi-Fi) presents coexistence challenges in terms of network performance especially for the Wi-Fi.

The Wi-Fi operates over unlicensed spectrum, is largely affected by the LTE users operating over the unlicensed spectrum. The Wi-Fi's performance is affected due to interference caused by the LTE users or any other users using the same unlicensed spectrum. Since, Wi-Fi operation in the presence of high and moderate interference from LTE (below Wi-Fi's prescribed energy detect level) experiences substantial degradation, there is a need for techniques that can mitigate the interference effect and improve Wi-Fi performance over the unlicensed spectrum.

SUMMARY

Embodiments of the present disclosure present technological improvements as solutions to one or more of the above-mentioned technical problems recognized by the inventors in conventional systems. For example, in one embodiment, a method and a system for improving Wi-Fi performance in co-existing communication networks is provided. The system includes a memory storing instructions, one or more communication interfaces; and one or more hardware processors coupled to the memory via the one or more communication interfaces, wherein the one or more hardware processors are configured by the instructions to a sense a plurality of inputs associated with a wireless signal in a co-existing communication network, the plurality of inputs comprises a current transmission channel for the wireless signal, a list of all available channels in the co-existing communication network, the signal strength, a throughput tolerance range, a classification energy threshold, an energy detection threshold, a carrier sensitivity threshold and a target throughput. The system is further configured to detect an interfering channel for the wireless signal, via the one or more hardware processors, based on the classification energy threshold, the energy detection threshold, and the carrier sensitivity threshold, wherein the interfering channel is causing an interference in performance of the wireless signal. The system is further configured to classify the interfering channel based on the classification Energy threshold, the energy detection threshold, and the carrier sensitivity threshold, wherein the classification includes a high interference channel, a moderate interference channel and low interference channel. The system is further configured to assign a channel state to the classified interfering channel, wherein the channel state includes one of a busy channel state and an idle channel state. The system is further configured to identify an optimal channel based on the channel state, via the one or more hardware processors, using an optimization technique, wherein the optimal channel is identified for the channel state that includes one of the busy channel and the idle channel state value. The system is further configured to and switch transmission of the wireless signal to the optimal channel from the current transmission channel to the optimal channel via the one or more hardware processors, using a frequency hopping technique, wherein the optimal channel enables improved Wi-Fi performance in the co-existing communication network by offering interference free transmission in the co-existing communication network.

In another aspect, a method for improving Wi-Fi performance in co-existing communication networks is provided. The method includes sensing a plurality of inputs associated with a wireless signal in a co-existing communication network, wherein the plurality of inputs comprises a current transmission channel for the wireless signal, a list of all available channels in the co-existing communication network, the signal strength, a throughput tolerance range, a classification energy threshold, an energy detection threshold, a carrier sensitivity threshold and a target throughput. The method further includes detecting an interfering channel for the wireless signal, based on the classification energy threshold, the energy detection threshold, and the carrier sensitivity threshold, wherein the interfering channel is causing an interference in performance of the wireless signal. The method further includes classifying the interfering channel, based on the classification energy threshold, the energy detection threshold, and the carrier sensitivity threshold, wherein the classification includes a high interference channel, a moderate interference channel and low interference channel. The method further includes assigning a channel state to the classified interfering channel, wherein the channel state includes one of a busy channel state or an idle channel state. The method further includes identifying an optimal channel based on the channel state, via the one or more hardware processors, using an optimization technique, wherein the optimal channel is identified for the channel state that is assigned the busy channel state. The method further includes switching transmission of the wireless signal to the optimal channel from the current transmission channel to the optimal channel, using a frequency hopping technique, wherein the optimal channel enables improved Wi-Fi performance in the co-existing communication network by offering interference free transmission in the co-existing communication network.

In yet another aspect, a non-transitory computer readable medium for improving Wi-Fi performance in co-existing communication networks is provided. The program includes sensing a plurality of inputs associated with a wireless signal in a co-existing communication network, wherein the plurality of inputs comprises a current transmission channel for the wireless signal, a list of all available channels in the co-existing communication network, the signal strength, a throughput tolerance range, a classification energy threshold, an energy detection threshold, a carrier sensitivity threshold and a target throughput. The program further includes detecting an interfering channel for the wireless signal, based on the classification energy threshold, the energy detection threshold, and the carrier sensitivity threshold, wherein the interfering channel is causing an interference in performance of the wireless signal. The program further includes classifying the interfering channel, based on the classification energy threshold, the energy detection threshold, and the carrier sensitivity threshold, wherein the classification includes a high interference channel, a moderate interference channel and low interference channel. The program further includes assigning a channel state to the classified interfering channel, wherein the channel state includes one of a busy channel state or an idle channel state. The program further includes identifying an optimal channel based on the channel state, via the one or more hardware processors, using an optimization technique, wherein the optimal channel is identified for the channel state that is assigned the busy channel state. The program further includes switching transmission of the wireless signal to the optimal channel from the current transmission channel to the optimal channel, using a frequency hopping technique, wherein the optimal channel enables improved Wi-Fi performance in the co-existing communication network by offering interference free transmission in the co-existing communication network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
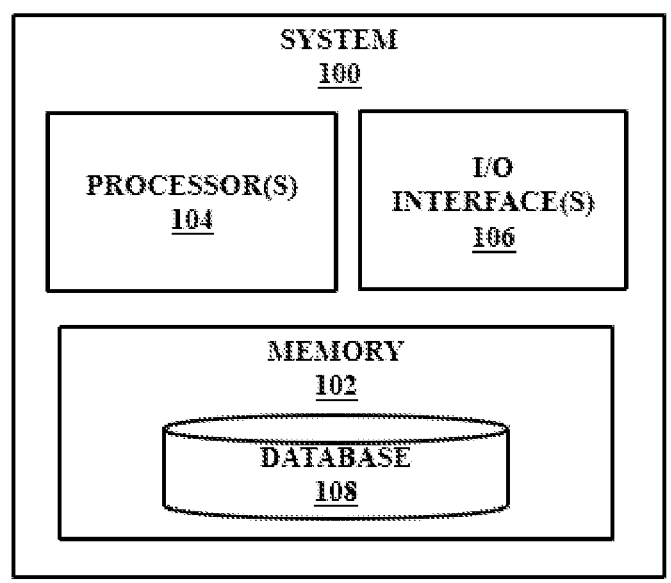
FIG. 1 illustrates an exemplary system for improving Wi-Fi performance in a co-existing communication networks according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 is a functional block diagram of a system 100 for improving Wi-Fi performance in co-existing communication networks in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitry, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example Local Area Network (LAN), cable, etc., and wireless networks, such as Wireless LAN (WLAN), cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding optimal channels and interference related data co-existing communication networks. Thus, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
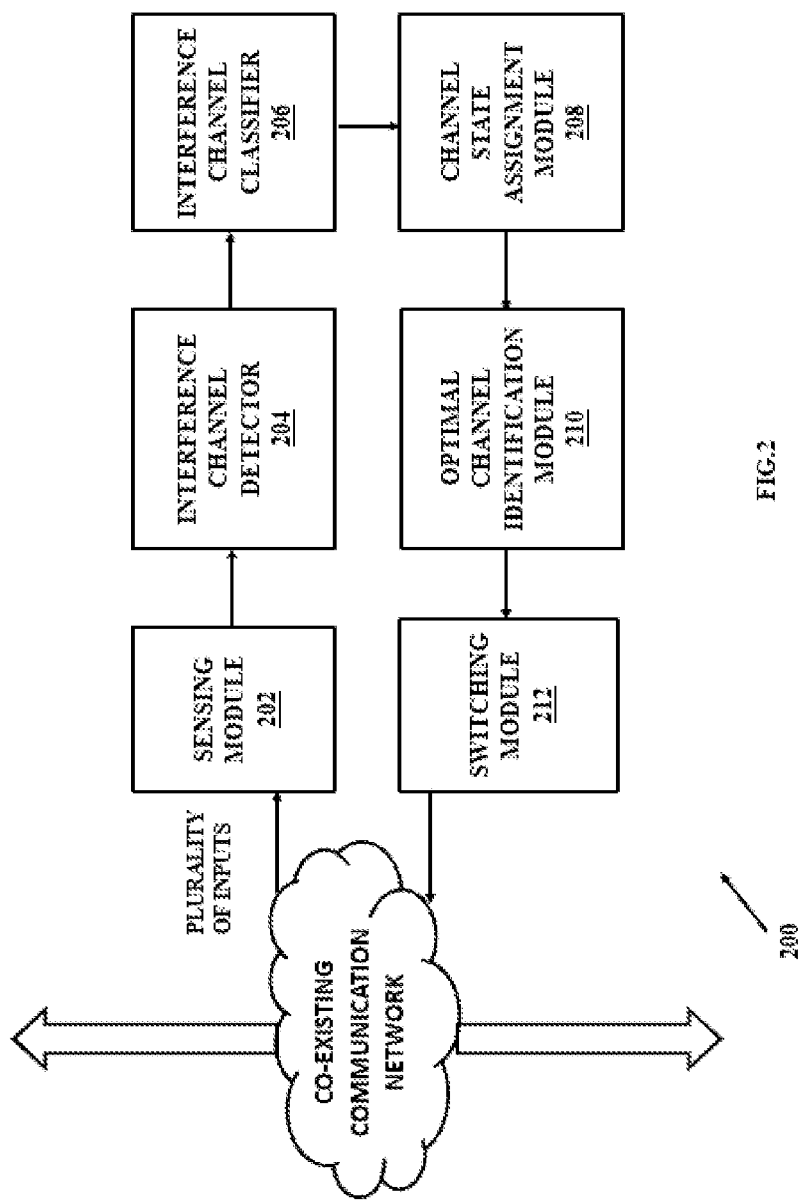
FIG. 2 is a functional block diagram of the system for improving Wi-Fi performance in the co-existing communication networks according to some embodiments of the present disclosure.
Figure 3A:
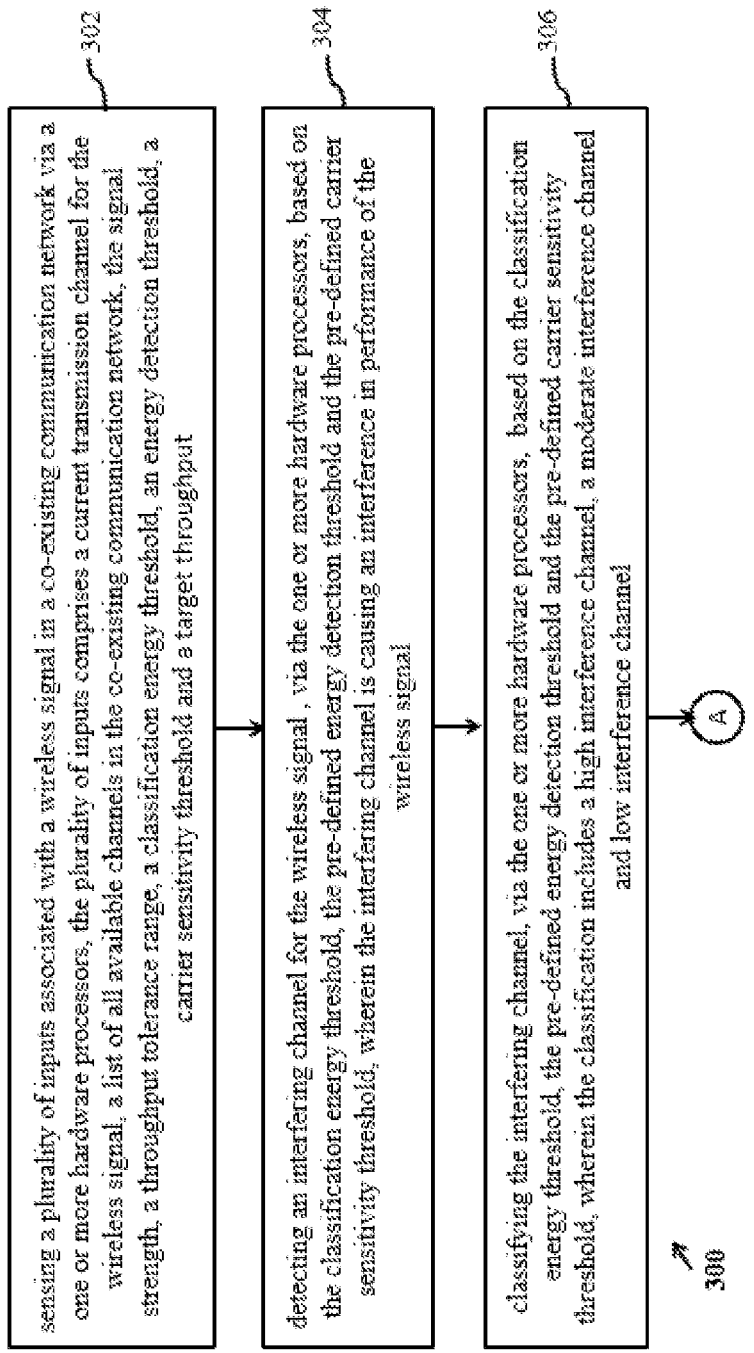
FIG. 3A and FIG. 3B is a flow diagram illustrating a method for improving Wi-Fi performance in the co-existing communication networks in accordance with some embodiments of the present disclosure.
Figure 3B:
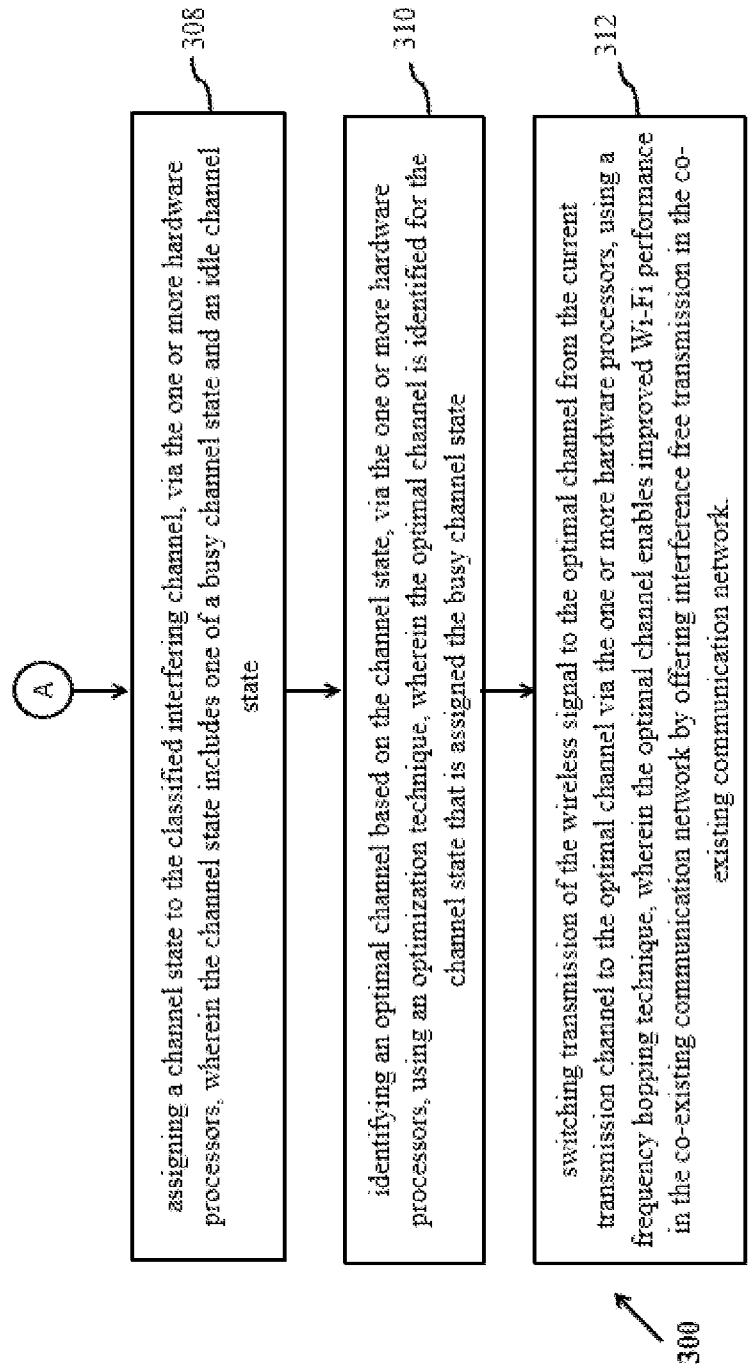

Functions of the components of system 100 are explained in conjunction with functional overview of the system 100 in FIG. 2 and flow diagram of FIGS. 3A and 3B for improving Wi-Fi performance in co-existing communication networks.

The system 100 supports various connectivity options such as BLUETOOTH®, USB, ZigBee® and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is a functional block diagram of the various modules of the system of FIG. 1, in accordance with some embodiments of the present disclosure. As depicted in the architecture, the FIG. 2 illustrates the functions of the components of the system 100 that includes improving Wi-Fi performance in co-existing communication networks.

The system 200 for improving Wi-Fi performance in co-existing communication networks is configured for sensing a plurality of inputs associated with a wireless signal in a co-existing communication network via a sensing module 202. The system 200 further comprises of an interference channel detector 204 that detects an interfering channel for the wireless signal. The system 200 further comprises of an interference channel classifier 206 configured for classifying the interfering channel. The system 200 further comprises of a channel state assignment module 208 configured for assigning a channel state to the classified interfering channel. The system 200 further comprises of an optimal channel identification module 210 configured for identifying an optimal channel based on the channel state. The system 200 further comprises a switching module 212 that switches the transmission of the wireless signal to the optimal channel from the current transmission channel.

The various modules of the system 100 for improving Wi-Fi performance in co-existing communication networks are implemented as at least one of a logically self-contained part of a software program, a self-contained hardware component, and/or, a self-contained hardware component with a logically self-contained part of a software program embedded into each of the hardware component that when executed perform the method described herein.

Functions of the components of the system 200 are explained in conjunction with functional modules of the system 100 stored in the memory 102 and further explained in conjunction with flow diagram of FIGS. 3A and 3B. FIG. 3A and FIG. 3B with reference to FIG. 1, is an exemplary flow diagram illustrating a method 300 for simultaneous learning and path planning using the system 100 of FIG. 1 according to an embodiment of the present disclosure.

The steps of the method of the present disclosure will now be explained with reference to the components of the system 100 for improving Wi-Fi performance in co-existing communication networks and the modules 202-212 as depicted in FIG. 2 and the flow diagrams as depicted in FIG. 3A and FIG. 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, a plurality of inputs associated with a wireless signal in a co-existing communication network is sensed via the sensing module 202. The plurality of inputs comprises a current transmission channel for the wireless signal, a list of all available channels in the co-existing communication network, the signal strength (Rx), a throughput tolerance range ($\zeta$), a classification energy threshold ($\gamma$), an energy detection threshold, a carrier sensitivity threshold and a target throughput (ThrTargetWiFi).

Figure 4:
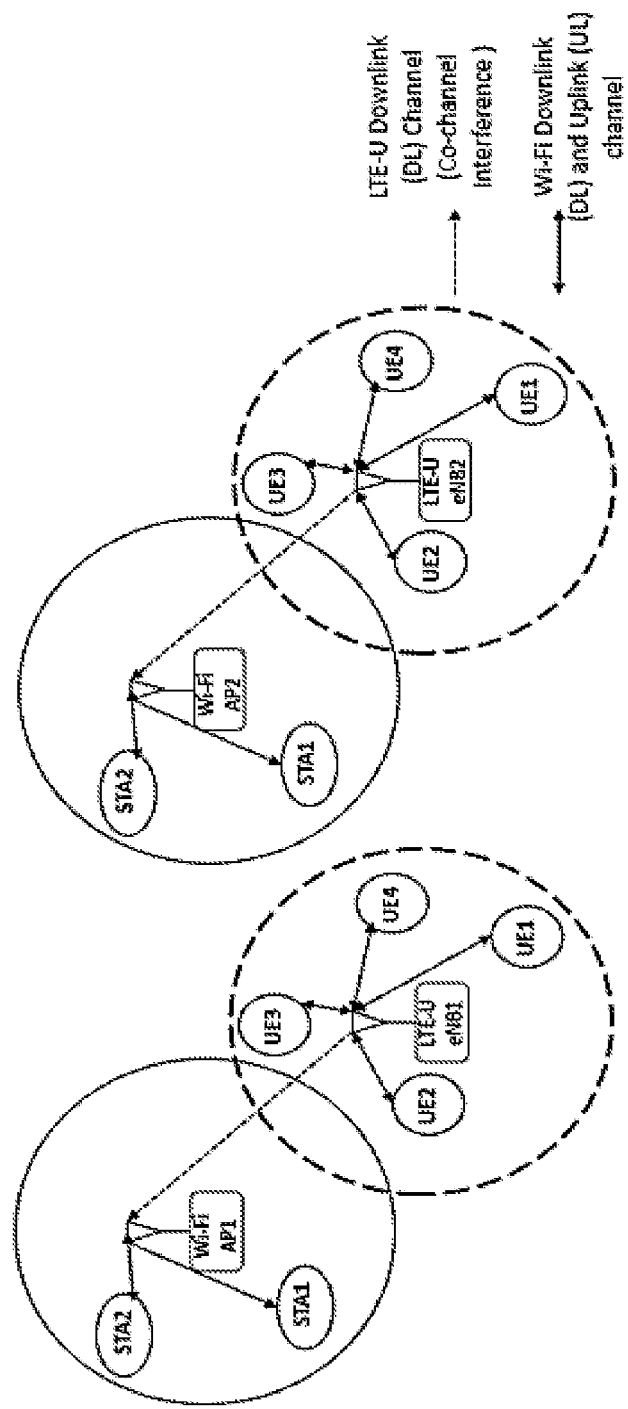
FIG. 4 illustrates an example scenario of the co-existing communication network in accordance with some embodiments of the present disclosure.

In an embodiment, the co-existing communication network comprises a telecom communication network deployed with at least one Wi-Fi, a LTE (Long-Term Evolution) Unlicensed (LTE-U) based 3GPP Communication comprising a LTE-U eNB serving one or more LTE User Equipment nodes (UE) over unlicensed spectrum co-existing with Wi-Fi network consisting a single or more Access Point(s) (AP) serving one or more users (STAs). An example scenario of a co-existing communication network is shown in FIG. 4, wherein the co-existing communication network comprises a single Access Point (AP) serving multiple Wi-Fi users (STAs). In addition, the co-existing communication network also includes is an LTE-U eNB (base station) serving several LTE User Equipment nodes (UE).

In an embodiment, the energy detection threshold and the carrier sensitivity threshold are pre-defined standard values defined by the IEEE 802.11 specification. The throughput tolerance range ($\zeta$), the classification energy threshold ($\gamma$) and the target throughput (ThrTargetWiFi) are pre-determined based on a user requirement. In an example scenario, based on the user requirement, the classification energy threshold ($\gamma$) is pre-determined as −72 dBm. The channel is considered busy if the signal energy level is above the energy detection threshold. The IEEE 802.11 specification requires that Wi-Fi preambles be decodable down to a power level of the carrier sensitivity threshold. Currently the pre-defined standard values of the energy detection threshold and the carrier sensitivity threshold are pre-defined as −62 dBm and −82 dBm respectively as per IEEE 802.11 specification. The pre-defined standard values of the energy detection threshold and the carrier sensitivity threshold are subject to modifications as per IEEE 802.11 specification and can be updated dynamically anytime.

At the next step 304 of the method 300, an interfering channel for the wireless signal is detected, via the interference channel detector 204. The interfering channel is causing an interference in performance of the wireless signal in the co-existing communication network.

The interfering channel for the wireless signal is detected based on the classification energy threshold ($\gamma$), the energy detection threshold and the carrier sensitivity threshold.

The energy detection threshold and the carrier sensitivity threshold are standard values defined by the IEEE 802.11 specification IEEE 802.11 standard defines Energy detection threshold and carrier sensitivity as explained below:

Energy Detection (ED) Threshold: When a device plans to transmit a wireless signal, it first goes into receive mode to detect and estimate the signal energy level in the desired channel. This task is known an energy detection (ED). In ED, the receiver does not try to decode the signal, and only the signal energy level is estimated. A channel is considered busy if the energy detection threshold is above −62 dBm.

Carrier Sensitivity: If a Wi-Fi preamble is decoded, the channel is busy for the duration of the corresponding Wi-Fi frame. The IEEE 802.11 specification requires that Wi-Fi preambles be decodable down to the carrier sensitivity threshold of −82 dBm.

At the next step 306 of the method 300, the interfering channel is classified, via the interference channel classifier 206. The interfering channel is classified based on the classification Energy threshold ($\gamma$), the energy detection threshold and the carrier sensitivity threshold, wherein the classification includes a high interference channel, a moderate interference channel and low interference channel.

In an embodiment, the interfering channel (LTE-U transmission) on the Wi-Fi AP is in the following scenarios:
(a) High Interference: when all devices, LTE-U eNB and Wi-Fi AP, are in close range and can hear each other at a power level above the energy detection threshold.
(b) Moderate Interference: when the LTE-U eNB and Wi-Fi AP hear each other at a power below the energy detection threshold, but with sufficient impact on Wi-Fi performance. The received energy is in the range of below the energy detection threshold but greater than the classification energy threshold ($\gamma$) which significantly degrades SINR (Signal-to-Interference-and-Noise Ratio) and thus reduces a Wi-Fi throughput.
(c) Low Interference: when the LTE-U eNB and Wi-Fi AP barely hear each other at a very low power, close to carrier sensitivity.

The above scenarios can be represented as shown below for a signal X(t) at time slot 't' based on the signal strength:

$$X(t) = \begin{cases} 1; & \text{if } Rx \geq \text{ energy detection threshold} \\ 1; & \text{if } \gamma \leq Rx < \text{ energy detection threshold} \\ 0; & \text{otherwise} \end{cases} \quad (1)$$

Figure 5:
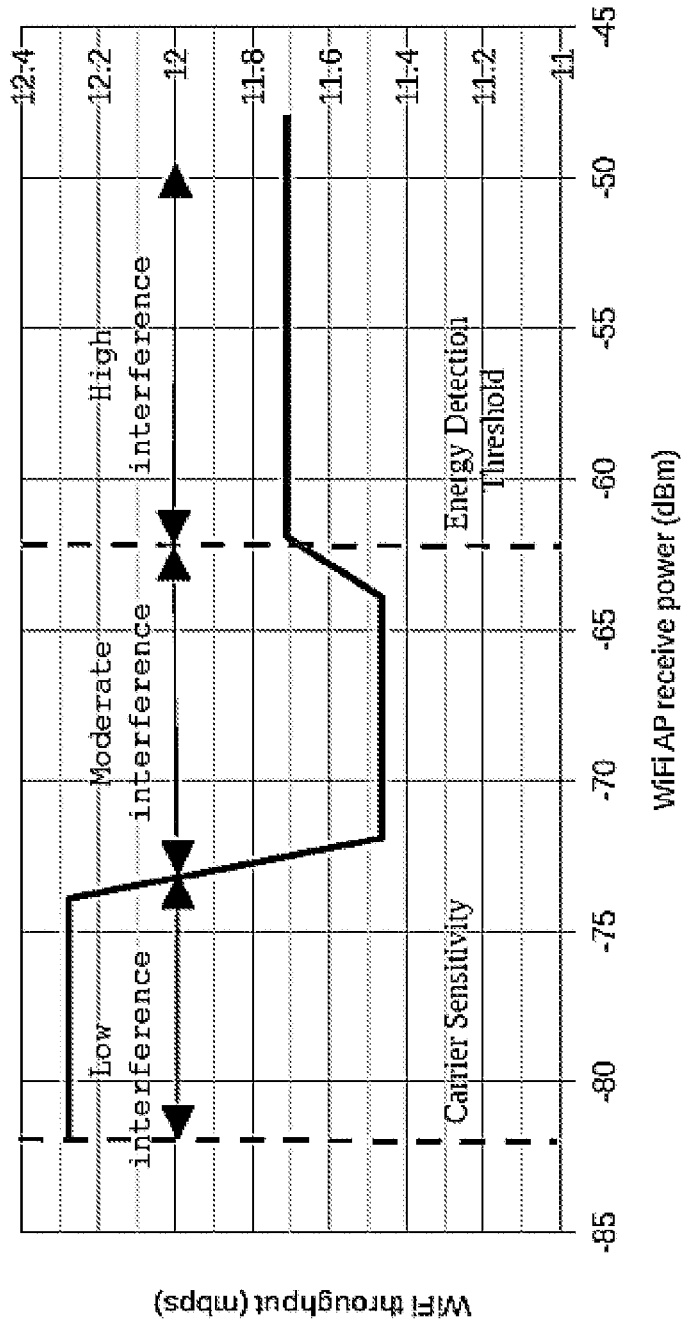
FIG. 5 illustrates different interference regions (includes a high interference channel, a moderate interference channel and low interference channel) in accordance with some embodiments of the present disclosure.

A graph is illustrated in FIG. 5 based on experimental results to demonstrate different interference regions. At high power levels (greater than −62 dBm of the energy detection threshold for 20 MHz channels) of the received LTE-U signal at the Wi-Fi AP, the Wi-Fi AP is able to sense the LTE-U signal using its ED-based physical Carrier Sense (CS) mechanism and therefore defer from the channel during the LTE-U ON phase. In scenarios wherein Wi-Fi Devices receive LTE Signals at moderate power levels (below the energy detection threshold but appreciably above the classification energy threshold ($\gamma$). ED-based Carrier Sense (CS) mechanism of Wi-Fi is unable to detect any ongoing LTE-U transmission at moderate power levels and hence Wi-Fi will also transmit during the LTE-U ON phase. However, signals that are quieter than the energy detection threshold may cause even more severe interference to Wi-Fi.

At the next step 308 of the method 300, a channel state is assigned to the classified interfering channel, via the channel state assignment module 208. The channel state includes one of a busy channel state and an idle channel state.

In an embodiment, the busy channel state is assigned to the high interfering channel and the moderate interfering channel, and the idle channel state value is assigned to the low interfering channel.

At the next step 310 of the method 300, an optimal channel is identified based on the channel state, via the optimal channel identification module 210. The optimal channel is identified using an optimization technique for the channel state that is assigned the busy channel state.

Figure 6:
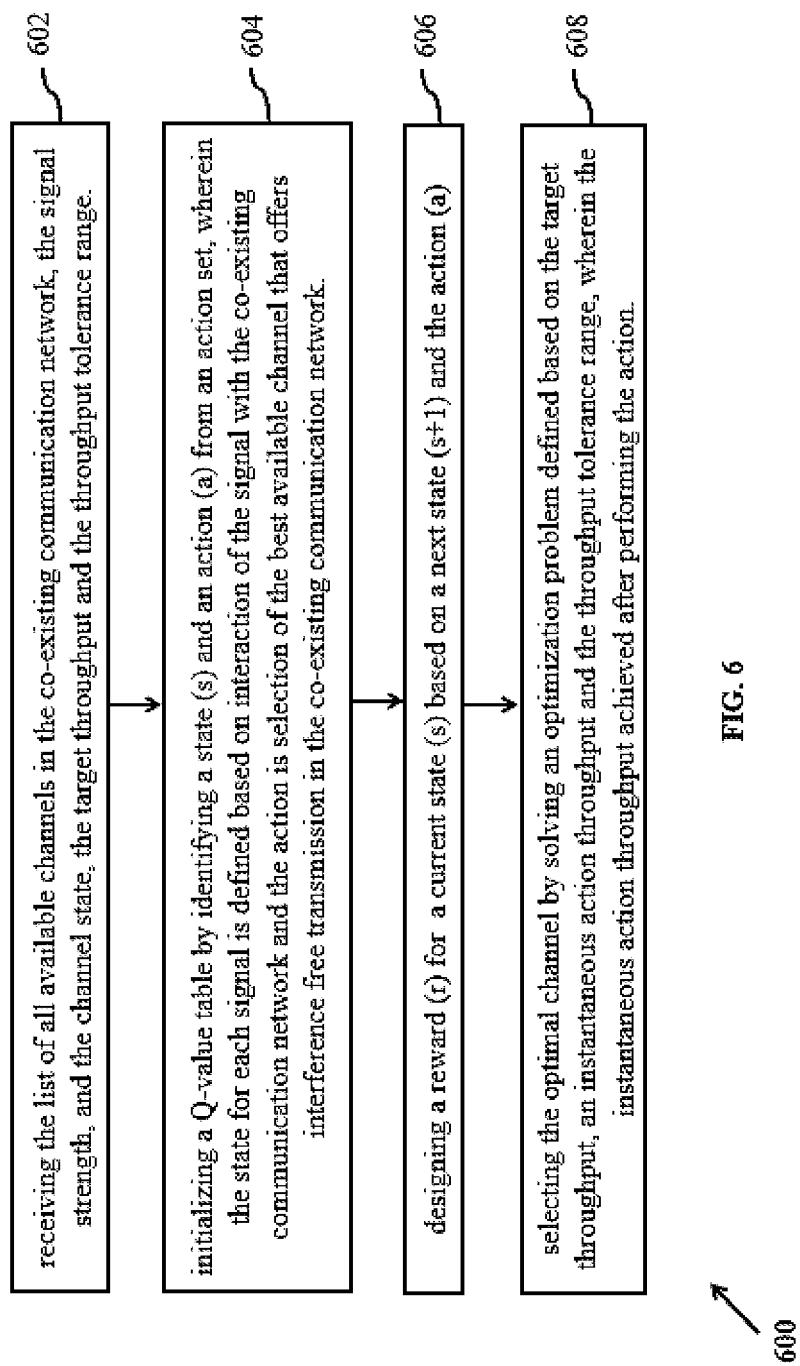
FIG. 6 is a flow diagram illustrating a method for optimization technique for identifying an optimal channel for improving Wi-Fi performance in co-existing communication networks in accordance with some embodiments of the present disclosure.

In an embodiment, the optimization technique is a reinforcement learning technique based on a Q-learning. The reinforcement learning technique based on a Q-learning is explained in detail using flow diagram 600 as depicted in FIG. 6. that comprises following steps:

At step 602 of the method 600, the list of all available channels based on the co-existing communication network, the received signal strength, and the channel state and the throughput tolerance range ($\zeta$) is received.

At step 604 of the method 600, a Q-value table is initialized. The Q-value is initialized by identifying a state (s) and an action (a) from an action set $a_i(t)$.

In an embodiment, the state for each signal is defined based on interaction of the signal with the co-existing communication network and the action is selection of the best available channel that offers interference free transmission in the co-existing communication network. The agents, states, actions and rewards of the Q-learning for optimal channel the co-existing communication network are defined as follows:

Agent: In the co-existing communication network scenario, every $i^{th}$ access point (AP) of a Wi-Fi network is an agent, is shown below:

$$\forall i \in \{1, 2, \ldots, N\} \quad (2)$$

State: For every agent, the state is selected by the interaction with the co-existing communication network scenario, the state $s_i(t)$ for an agent i at the time instance t is represented as:

$$s_i(t) = \{X^i\} \text{ where } X^i \in [1, 0] \quad (3)$$

Action (a): The action of the agent i is to select the best available channel that can offer interference free transmission with other co-existing communication network. Wherein action is selected from the list of all available channels based on the co-existing communication network depending upon the operating unlicensed spectrum of the co-existing communication network as shown below:

$$a_i(t) \in \{ch_1, ch_2, \ldots, ch_k\}; \quad (4)$$

where,
$ch_1, ch_2, \ldots, ch_k$ are the list of all available channels (ch) till k At step 606 of the method 600, a reward (r) is designed for a current state (s) based on a next state (s+1) and the action (a). The reward is represented as shown below:

$$R = \begin{cases} 1/|ThrTargetWiFi_i - ThrActionWiFi_i|, & \text{for } Thrdif < \zeta \\ -10, & \text{for } Thrdif \geq \zeta \end{cases}$$

where,
ThrTargetWiFi$_i$ is the target throughput at $i^{th}$ AP;
ThrActionWiFi$_i$ is an instantaneous action throughput achieved after performing the action a; and
Thrdif is the absolute value of the difference in performance between the target throughput and the instantaneous action throughput (Thrdif=|ThrTargetWiFi$_i$−ThrActionWiFi$_i$|).

Hence, based on Equation(5), after an action is performed the obtained throughput is close to the target throughput (ThrTargetWiFi) then it can be understood that the absolute difference is within the tolerance range, then the agent receives a reward that is inversely proportional to the deviation of the obtained throughput from the target throughput, else, the agent receives a negative reward. The target throughput (ThrTargetWiFi) and the tolerance range ($\zeta$) are defined by user as per the user's current requirement.

At step 608 of the method 600, the optimal channel is selected by solving an optimization problem. The optimization problem is defined based on the target throughput, the instantaneous action throughput, and the throughput tolerance range ($\zeta$).

$$Ch_i^* = \arg_{Ch} \max(1/|ThrTargetWiFi_i - ThrActionWiFi_i|) \quad (6)$$

Such that,

C1:|ThrTargetWiFi$_i$−ThrActionWiFi$_i$|<$\zeta$; i∈ {1,2, ..., N} C2:Ch=[ch$_1$, ch$_2$, ..., ch$_k$]

The above mentioned optimization problem enables selection of the optimal channel Ch* such that the throughput of an $i^{th}$ access point remains close to the target or expected throughput value, where target throughput is a throughput value which is achieved without presence of any other co-located unlicensed network. The tolerance range ($\zeta$) makes sure that the Wi-Fi Access Point throughput remains in an acceptable range. The parameter ($\zeta$) is a user defined constant which depends on the expected QoS (Quality of Service) of the network by the user. Another constraint of the channel range depends on the operating unlicensed band of the network. In an example scenario, Wi-Fi network operating in 5 GHz band, the channel numbers are considered as ch=[36, 40, 44, 48, 52, 56, 60 and 64] for indoor environment, of these channels an optimal channel is selected based on the optimization problem.

Referring to FIG. 3A and FIG. 3B, at the next step 312 of the method (300), the transmission of wireless signal is switched to the optimal channel from the current transmission channel via the one or more hardware processors. The optimal channel enables improved Wi-Fi performance in the co-existing communication network by offering interference free transmission in the co-existing communication network. The wireless signal is switched using a frequency hopping technique.

In an embodiment, the frequency hopping technique includes an interference mitigation strategy: interference-aware channel assignment.

Experiments

Figure 7:
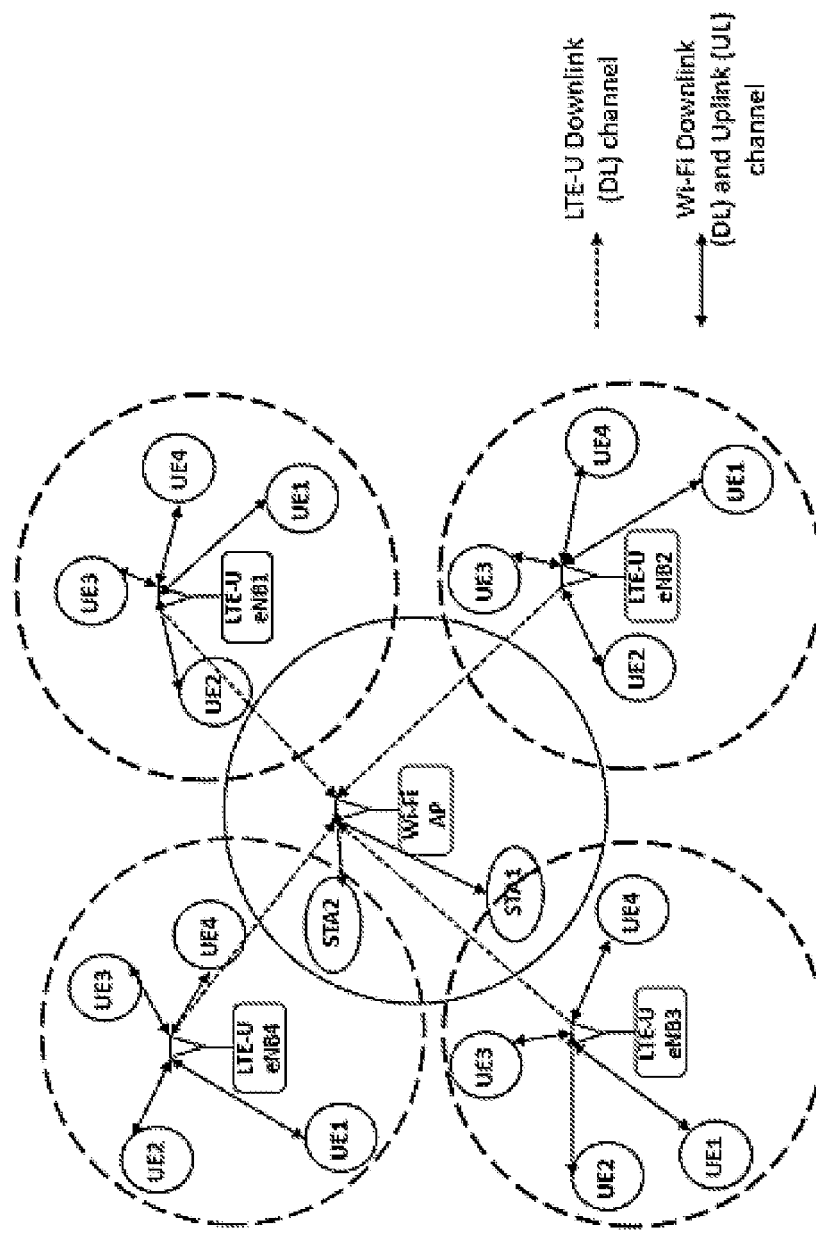
FIG. 7 illustrates an experimental scenario of a Wi-Fi network co-located with an unlicensed LTE (Long-Term Evolution) network in the co-existing communication network in accordance with some embodiments of the present disclosure.

An experiment has been conducted to enable improving the Wi-Fi performance in the co-existing communication networks based on the disclosed learning methodologies. For experimentation purpose, a Network Simulator(NS)–3™ simulator to model a scenario of a Wi-Fi network co-located with an unlicensed LTE network (LTE-U (LTE-Unlicensed)/LAA (Licensed-Assisted Access)) as illustrated in FIG. 7. The simulated Wi-Fi network consists of a single Access Point (AP) serving multiple Wi-Fi users (STAs) on channel number 36. In addition, the simulated Wi-Fi network are four LTE-U base stations operating on channel number 36, 40, 44, 48 with bandwidth of 20 MHz each and serving several LTE User Equipment (UE) nodes. All Wi-Fi devices and LTE-U base stations operate on a 20 MHz wide channel in an unlicensed band. Further, the same topology can be extended for a number of LTE-base stations and Wi-Fi APs. The co-located unlicensed LTE network's downlink (from eNB1 (eNB on channel number 36) to UEs) transmission creates interference with the Wi-Fi uplink (STAs to AP) and downlink (AP to STAs) transmissions. This causes a co-channel interference between LTE-U eNB1 and Wi-Fi AP. Multiple simulations are performed for different interference levels (received signal power) for each duty cycle. Following this approach, the Duty Cycle value used is in the range of 0.2 to 0.9 with a granularity 0.1. The offered data rate follows the full buffer scheme, i.e., user datagram protocol (UDP) transmission with a constant bit rate. The coexistence performance evaluated in an indoor scenario. Further it is to be noted that the LTE-U nodes are energy detected by Wi-Fi at −62 dBm, while Wi-Fi nodes are energy detected by LTE-U at −72 dBm, and Wi-Fi nodes preamble detect each other at −82 dBm. The simulation is set to either run for 200 consecutive simulation runs (episodes) or till the learning phase of the algorithm converges. The parameters used in the simulation, for both LTE-U and Wi-Fi, are presented in Table 1 below:

| Wi-Fi parameter | |
|---|---|
| Carrier frequency | 5 GHz |
| Energy Detection threshold | −62 dBm |
| Carrier sense threshold | −82 dBm |
| LTE-U parameters | |
| Packet scheduler | Proportional fair |
| ABS pattern duration | 40 ms |
| Duty cycle values | {0.2, 0.3, 0.4, 0.5, 0.6, 0.7, 0.8, 0.9} |

| Common parameters | |
|---|---|
| Bandwidth | 20 MHz; |
| Transmission power | 18 dBm |
| Traffic model | UDP full buffer; UDPRate {2 Mbps, 4 Mbps} |
| Mobility | Constant position |
| Network Scenario | |
| Distance between base station and the user | 5 m |
| Distance between two base stations | 25 m |
| Number of LTE-U eNBs | 4 |
| Number of LTE-U stations | 4 |
| Number of Wi-Fi Aps | 1 |
| Number of Wi-Fi stations | 2 |
| Path loss and Shadowing | ITU InH; IEEE 802.11ax indoor model |
| Antenna pattern | 2D Omni-directional |

Figure 8:
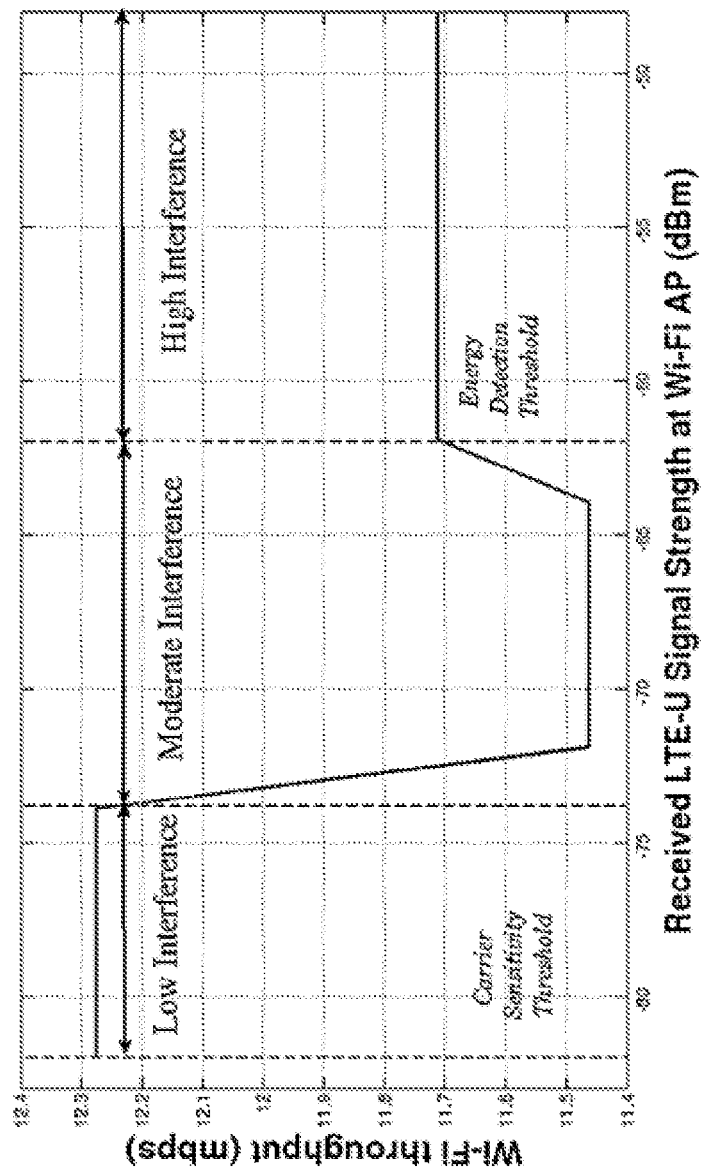
FIG. 8 illustrates a graph demonstrating different interference regions during the experimental scenario of a Wi-Fi network co-located with an unlicensed LTE network in the co-existing communication network in accordance with some embodiments of the present disclosure.

Further multiple experiments are conducted over the discrete event simulator to understand the impact of LTE-U co-channel interference on Wi-Fi network performance. In the experiments the standard defined as per IEEE 802.11 specification are considered for the energy detection threshold and the carrier sensitivity threshold for classifying the different interference levels. It can be inferred from the experimental results are illustrated in FIG. 8 which demonstrates different interference regions. At high power levels (greater than −62 dBm for 20 MHz channels) of the received LTE-U signal at the Wi-Fi AP, the Wi-Fi AP is able to detect the LTE-U signal using its ED-based physical carrier sense (CS) mechanism and hence Wi-Fi network defers from the data transmission during the period LTE-U remains in the transmission (ON) phase. Further it is also observed that the scenario where Wi-Fi AP Receives LTE-U Signals at some moderate power levels (i.e., below −62 dBm Energy Detection (ED) threshold but appreciably above some user defined energy threshold) which has sufficient impact on the Wi-Fi performance. The ED-based Carrier Sense (CS) mechanism of Wi-Fi does not sense any ongoing LTE-U transmissions at these moderate power levels and hence during this period both Wi-Fi and LTE-U transmit simultaneously causing interference. Hence, signals that are less than −62 dBm may cause even more severe interference to Wi-Fi.

For experimentation purpose a Reinforcement Learning (RL) framework is integrated with the Network Simulator (NS)-3™. The simulated communication network provides a multi-agent environment (e.g. wireless network) and the integrated RL framework enables interaction with the environment and validate Learning-based techniques.

Figure 9:
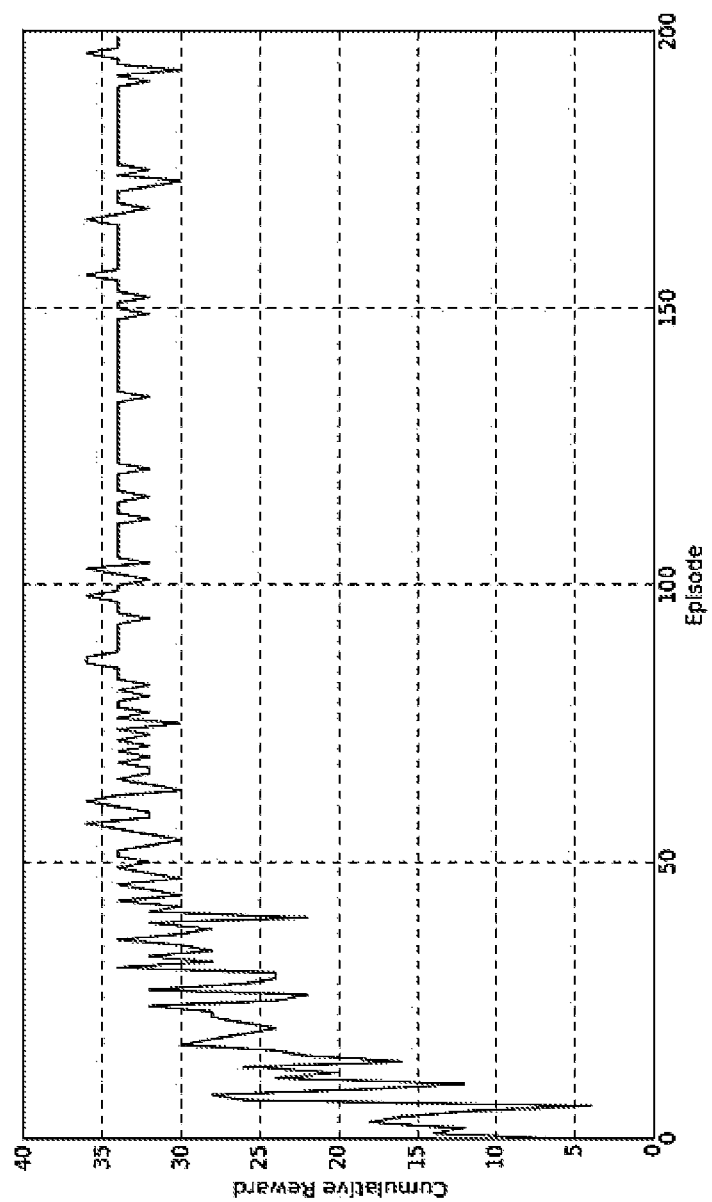
FIG. 9 illustrates a graph of a learning performance of the system for improving Wi-Fi performance in the co-existing communication networks to select the optimal channel in accordance with some embodiments of the present disclosure.

The FIG. 9 illustrates the learning performance of the disclosed technique in a co-existing network to select the optimal channel. It is inferred from the learning performance that by sensing the state of all the available channels the model learns the behavior of the interfering channel and predicts an interference-free channel for the next time-slot. Further it is observed that after around 80 consecutive simulation (episodes) runs the RL framework is able to predict the next channel state from the current observations hence avoiding any collision with the interference.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments for enable improved Wi-Fi performance in the co-existing communication network by offering interference free transmission in the co-existing communication network. In the existing communication networks, simultaneous use of unlicensed band (by operators using LTE and other Wi-Fi) presents co-existence challenges in terms of network performance especially for the Wi-Fi. The disclosed techniques enable improving the Wi-Fi performance in the co-existing communication networks based on learning methodologies. The disclosed techniques improve Wi-Fi performance based on several steps that includes detecting an interfering channel, and further identifying an optimal channel to mitigate the interference caused by the detected interfering channel. The optimal channel is identified based on an optimization technique, wherein the optimization technique is a reinforcement learning technique based on a Q-learning.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for improving Wi-Fi performance in a co-existing communication network comprising:

sensing a plurality of inputs associated with a wireless signal in a co-existing communication network via one or more hardware processors, the plurality of inputs comprising a current transmission channel for the wireless signal, a list of all available channels in the co-existing communication network, the signal strength of the wireless signal, a throughput tolerance range ($\zeta$), a classification energy threshold ($\gamma$), an energy detection threshold, a carrier sensitivity threshold and a target throughput (ThrTargetWiFi);

detecting an interfering channel for the wireless signal, via the one or more hardware processors, based on the classification energy threshold ($\gamma$), the energy detection threshold and the carrier sensitivity threshold, wherein the interfering channel causes an interference in the performance of the wireless signal;

classifying the interfering channel, via the one or more hardware processors, based on the classification energy threshold ($\gamma$), the energy detection threshold and the carrier sensitivity threshold, wherein the classification includes a high interference channel, a moderate interference channel and a low interference channel;

assigning a channel state to the classified interfering channel, via the one or more hardware processors, wherein the channel state includes either a busy channel state or an idle channel state;

identifying an optimal channel based on the channel state, via the one or more hardware processors, using an optimization technique, wherein the optimal channel is identified for the channel state that is assigned the busy channel state; and switching transmission of the wireless signal from the current transmission channel to the optimal channel via the one or more hardware processors, using a frequency hopping technique, wherein the optimal channel enables improved Wi-Fi performance in the co-existing communication network by offering interference free transmission in the co-existing communication network.

2. The method of claim 1, wherein the co-existing communication network comprises a telecom communication network deployed with at least one Wi-Fi network and a Long-Term Evolution Unlicensed (LTE-U) based 3GPP Communication in an unlicensed spectrum comprising an LTE-U eNB serving one or more LTE User Equipment nodes (UE) over unlicensed spectrum co-existing with Wi-Fi network consisting of one a single or more Access Point(s) (AP) serving one or more users (STAs).

3. The method of claim 1, wherein the energy detection threshold and the carrier sensitivity threshold are standard values pre-defined by IEEE 802.11 specification and the throughput tolerance range ($\zeta$), and the classification energy threshold ($\gamma$) and a target throughput (ThrTargetWiFi) are defined based on a user requirement.

4. The method of claim 1, wherein the busy channel state is assigned to the high interfering channel and the moderate interfering channel, and the idle channel state-value is assigned to the low interfering channel.

5. The method of claim 1, wherein the optimization technique is a reinforcement learning technique based on a Q-learning, that comprises:

receiving the list of all available channels in the co-existing communication network, the signal strength of the wireless signal, the channel state, the target throughput, and the throughput tolerance range ($\zeta$);

initializing a Q-value table by identifying one or more states and an action (a) from an action set $a_i(t)$, wherein the state for the wireless signal is defined based on interaction of the wireless signal with the co-existing communication network and the action is selection of the best available channel that offers interference free transmission in the co-existing communication network;

designing a reward (r) for a current state of the one or more states based on a next state (s+1) and the action (a); and selecting the optimal channel by solving an optimization problem defined based on the target throughput, an instantaneous action throughput and the throughput tolerance range ($\zeta$), wherein the instantaneous action throughput is achieved after performing the action (a).

6. The method of claim 1, wherein the frequency hopping technique includes an interference mitigation strategy which comprises interference-aware channel assignment.

7. A system comprising:

an input/output interface;

one or more memories; and one or more hardware processors, the one or more memories being coupled to the one or more hardware processors, wherein the one or more hardware processors are configured to execute programmed instructions stored in the one or more memories, to:

sense a plurality of inputs associated with a wireless signal in a co-existing communication network, wherein the plurality of inputs comprise a current transmission channel for the wireless signal, a list of all available channels in the co-existing communication network, the signal strength of the wireless signal, a throughput tolerance range ($\zeta$), a classification energy threshold ($\gamma$), an energy detection threshold, a carrier sensitivity threshold and a target throughput (ThrTargetWiFi);

detect an interfering channel for the wireless signal based on the classification energy threshold ($\gamma$), the energy detection threshold and the carrier sensitivity threshold, wherein the interfering channel causes an interference in the performance of the wireless signal;

classify the interfering channel based on the classification energy threshold ($\gamma$), the energy detection threshold and the carrier sensitivity threshold, wherein the classification includes a high interference channel, a moderate interference channel and a low interference channel;

assign a channel state to the classified interfering channel, wherein the channel state includes either a busy channel state or an idle channel state;

identify an optimal channel based on the channel state using an optimization technique, wherein the optimal channel is identified for the channel state that includes one of the busy channel and the idle channel state; and switch transmission of the wireless signal from the current transmission channel to the optimal channel via the one or more hardware processors, using a frequency hopping technique, wherein the optimal channel enables improved Wi-Fi performance in the co-existing communication network by offering interference free transmission in the co-existing communication network.

8. The system of claim 7, wherein the one or more hardware processors are configured by the instructions to assign the busy channel state to the high interfering channel and the moderate interfering channel, and assign the idle channel state value to the low interfering channel.

9. The system of claim 7, wherein the one or more hardware processors are configured by the instructions to perform the optimization technique, wherein the optimization technique is a reinforcement learning technique based on a Q-learning that comprises:

receiving the list of all available channels based on the co-existing communication network, the signal strength of the wireless signal, the target throughput, the channel state, and the throughput tolerance range ($\zeta$);

initializing a Q-value table by identifying one or more states and an action (a) from an action set $a_t(t)$, wherein the state for the wireless signal is defined based on interaction of the wireless signal with the co-existing communication network and the action is selection of the best available channel that offers interference free transmission in the co-existing communication network;

designing a reward (r) for a current state of the one or more states based on a next state (s+1) and the action (a); and selecting the optimal channel by solving an optimization problem defined based on the target throughput, an instantaneous action throughput, and the throughput tolerance range ($\zeta$), wherein the instantaneous action throughput is achieved after performing the action (a).

10. The system of claim 7, wherein the one or more hardware processors are configured by the instructions to perform the frequency hopping technique, wherein the frequency hopping technique includes an interference mitigation strategy which comprises interference-aware channel assignment.

11. One or more non-transitory machine-readable information storage mediums comprising one or more instructions which when executed by one or more hardware processors cause:

sensing a plurality of inputs associated with a wireless signal in a co-existing communication network via the one or more hardware processors, the plurality of inputs comprise a current transmission channel for the wireless signal, a list of all available channels in the co-existing communication network, the signal strength of the wireless signal, a throughput tolerance range ($\zeta$), a classification energy threshold ($\gamma$), an energy detection threshold, a carrier sensitivity threshold and a target throughput (ThrTargetWiFi);

detecting an interfering channel for the wireless signal, via the one or more hardware processors, based on the classification energy threshold ($\gamma$), the energy detection threshold and the carrier sensitivity threshold, wherein the interfering channel causes an interference in the performance of the wireless signal;

classifying the interfering channel based on the classification energy threshold ($\gamma$), the energy detection threshold and the carrier sensitivity threshold, wherein the classification includes a high interference channel, a moderate interference channel and a low interference channel;

assigning a channel state to the classified interfering channel, wherein the channel state includes either a busy channel state or an idle channel state;

identifying an optimal channel based on the channel state, via the one or more hardware processors, using an optimization technique, wherein the optimal channel is identified for the channel state that includes one of the busy channel and the idle channel state; and switching transmission of the wireless signal from the current transmission channel to the optimal channel via the one or more hardware processors, using a frequency hopping technique, wherein the optimal channel enables improved Wi-Fi performance in the co-existing communication network by offering interference free transmission in the co-existing communication network.

* * * * *